United States Patent [19]

Hernandez et al.

[11] Patent Number: 5,686,669

[45] Date of Patent: *Nov. 11, 1997

[54] APPARATUS AND METHOD FOR ANALYZING THE CONDITION AND PERFORMANCE OF TURBOMACHINES BY PROCESSING SIGNALS REPRESENTING ROTOR MOTION

[75] Inventors: Walter C. Hernandez, Potomac, Md.; Frederick Vosburgh, Vienna, Va.

[73] Assignee: Monitoring Technology Corporation, Fairfax, Va.

[*] Notice: The term of this patent shall not extend beyond the expiration date of Pat. No. 5,501,105.

[21] Appl. No.: 610,085

[22] Filed: Feb. 29, 1996

[51] Int. Cl.$^6$ .................... G01H 11/00; G01H 1/00; G08B 23/00; G01N 29/00

[52] U.S. Cl. .................... 73/660; 73/659; 73/650

[58] Field of Search .................... 73/657, 658, 659, 73/660, 661, 650; 340/683; 364/508

[56] References Cited

U.S. PATENT DOCUMENTS 5,105,105   4/1992   Hernandez et al. .................... 324/227

Primary Examiner—Walter E. Snow
Attorney, Agent, or Firm—Woodbridge & Associates

[57] ABSTRACT

A method and device for processing encoder signals from turbomachines to produce frequency modulation signals representing fully isolated rotor vibrational resonances. Multi-sensor and multi-sideband group processing provides enhanced results. The method provides dramatically improved frequency resolution. Amplitude modulation and random noise effects are removed by a variety of artifact-free techniques. Signals then are completely separated into components for rotational vibration and translational vibration. Fully isolating rotational vibration unmasks previously undetectable signal components of diagnostic value. In cases of high background vibration, Wiener filtering removes the effects of exogenous vibration. By these various techniques, the present invention provides significantly enhanced diagnostic information regarding condition and performance in turbomachines.

19 Claims, 6 Drawing Sheets

APPARATUS AND METHOD FOR ANALYZING THE CONDITION AND PERFORMANCE OF TURBOMACHINES BY PROCESSING SIGNALS REPRESENTING ROTOR MOTION

BACKGROUND OF THE INVENTION

1. Field of the Invention

The present invention relates to a method and device for separating components of rotor vibration signals from turbomachines to provide enhanced diagnostic information on rotor mechanical condition and performance, primarily by monitoring changes in resonance frequency.

2. Prior Art

Current monitoring technology is inadequate for predicting costly rotor failures in power turbines and related capital-intensive machinery. Existing technology measures displacements, or translational motions, of a rotor shaft to detect imbalance caused by mechanical failure, such as the loss of a turbine blade. Except for motion caused by imbalance, rotor vibration occurs primarily in the direction of rotation. This couples poorly with the translational modes sensed by traditional vibration sensors. As a result, such sensors are ill suited for predicting impending mechanical failures in turbomachine rotors.

In the present discussion, encoders are devices such as tachometer wheels that are attached to shafts or other rotor components as a means for detecting rotor or shaft rotation. Vibration detected by processing encoder signals is classed herein either as rotational or translational vibrations. Rotational vibration represents rotor vibrational resonances in the direction of rotor rotation, as well as driven torsional vibrations at other frequencies. Translational vibration includes both lateral bending resonances and rigid body motion of the rotor.

In the frequency domain, an encoder signal consists of a carrier signal component and its harmonics together with the groups of sidebands representing modulations around each encoder carrier harmonic. These sidebands may be amplitude modulations (AM) or frequency modulations (FM) or random noise. With this in mind, a signal is considered here to be composed of a series of "subsignals," each having a carrier frequency harmonic and a surrounding group of sidebands. The frequency composition of each subsignal is equivalent except for random noise effects. The amplitudes and phases of the sidebands may, however, differ by a known amount. Similarly, the signals from two sensors detecting one encoder have equivalent frequency contents, although the magnitudes and phases again will differ predictably. From this, it can be seen that subsignals from the sensors monitoring a rotor have equivalent frequency contents, which is used herein for the first time to provide improved diagnostic information on machine condition.

U.S. Pat. No. 5,365,787, assigned to the same assignee of the present invention, discloses means of detecting rotor vibrations in turbomachines by processing encoder, or tachometer, signals. This method prevents the introduction of spurious signal components termed leakage artifacts around the spectral peaks representing the carrier signal and the harmonics of rotor turning speed. Leakage can dominate and mask signal components of diagnostic interest. This method removes masking effects of amplitude modulation (AM) but introduces artifacts that can mask or be mistaken for diagnostic resonances of the rotor. This method also fails to isolate frequency modulation (FM) components representing rotational vibration from those representing translational vibration, thereby making analysis more difficult and less reliable. Lastly, this method does not address applications to variable speed machinery. The present invention removes AM without introducing artifacts and separates FM components due to rotational from those due to translational vibration in constant or variable speed turbomachines.

U.S. patent application Ser. No. 08/290,375 filed Aug. 15, 1994, now U.S. Pat. No. 5,501,105 also assigned to the same assignee of the present invention, discloses improved removal of spectral leakage and generalizes the method for variable speed applications. The disclosed method, however, does not remove dominating signal components that mask diagnostic signals components, thereby limiting sensitivity in detecting small but important signal components. This method also fails to separate rotational vibrations from translational vibrations of the rotor. The present invention removes AM effects without introducing artifacts, selectively removes sensitivity-limiting components not of diagnostic interest, and isolates FM signal components due to rotor resonances. Each of these improvements is achieved without introducing artifacts that would compromise the benefits of the aforementioned advances.

In sum, industry until now has lacked adequate means of detecting mechanical defects in turbomachinery because it previously relied on inappropriate sensors and crude processing techniques, which are incapable of properly isolating resonance information with sufficient sensitivity and resolution to adequately and reliably warn of impending rotor failures.

The present invention solves the problem by processing encoder signals in a series of steps involving multiple sensor signals and multiple subsignals to remove AM signal components and isolates FM signal components due to rotational vibration from those due to translational vibration. It also removes large signal components that can mask or be mistaken for diagnostically important signal components. Lastly, it further processes signals to provide dramatically improved frequency resolution in either constant or variable speed applications, thereby improving early detection problems that will lead to catastrophic failure. By filling the identified technical void, the present invention will enable industry to run all classes of turbomachines longer and safer for less money.

SUMMARY OF THE INVENTION

The present invention relates to a method and device for acquiring and processing rotation signals from turbomachines providing information on condition and performance in turbomachines. It provides improved ability to detect mechanical problems with rotor shafts, disks and blades, including cracks, erosion and/or contamination. It also detects such adverse operating conditions as flutter or stall and can be used to quantify efficiency, torque and power output in turbomachines.

The invention processes pulsed encoder, or tachometer, signals to isolate components due to rotational vibrations and translational vibrations of a rotor. It removes large, masking components from the signal without otherwise altering the signal, which significantly improves sensitivity to small, diagnostically significant rotor resonances. The method also provides extremely high accuracy and resolution of resonance frequencies, which constitute a highly reliable quantifier of mechanical deterioration that has not been used effectively in on-line monitoring of turbomachinery until now.

The present invention also provides two methods of removing AM signal components neither of which introduce signal artifacts that can mask or be mistaken for diagnostically significant resonances. Artifacts are spurious signal components introduced when acquiring or processing a signal. The present invention can also provide spectra composed only of AM components, free of FM signal components, which can be used to determine bending resonances and related motions of the rotor. Finally, it fully separates the isolated FM components into those due to rotational vibration and due to translational vibration.

The present invention measures resonance frequencies with significantly improved resolution and precision. By tracking precise changes in frequency, the present invention determines more precisely the magnitude of mechanical problems and the time to catastrophic failure. Such problems include cracks in, contamination on, or erosion of rotor shafts, disks and blades. By quantitatively tracking such problems, the present invention enables for the first time accurate forecasting of rotor failures in all classes of turbomachines.

The details of the invention can be better understood with respect to the following figures.

BRIEF DESCRIPTION OF THE FIGURES

FIG. 6b illustrates the correlation between crack size and shift in resonant frequency of the shaft resonance in FIG. 6a.

DETAILED DESCRIPTION OF THE PREFERRED EMBODIMENT

During the course of this description like numbers will be used to identify like elements according to the different figures that illustrate the invention.

The present invention consists of a method and device 100 for monitoring the mechanical condition and performance of all classes of turbomachines. Most importantly, the invention provides spectra composed exclusively of FM components representing rotational vibration of the rotor with sensitivity and frequency resolution higher than can be achieved with any other technology known to the inventors. It also provides two means of removing AM signal components that avoids artifacts created by prior technology. In addition, it selectively removes dominant signal components that are not of diagnostic interest. The result is a dramatic increase in sensitivity and the ability to isolate resonant frequencies of diagnostic interest.

Frequency shifts in the resonant vibrations of a machine are precise and reliable indicators of changes in the mechanical condition of the various components of the machine. By measuring rotor rotational vibrational resonances with greatly improved sensitivity and resolution, the present invention provides an extremely sensitive and precise means of detecting rotor changes.

Figure 1A:
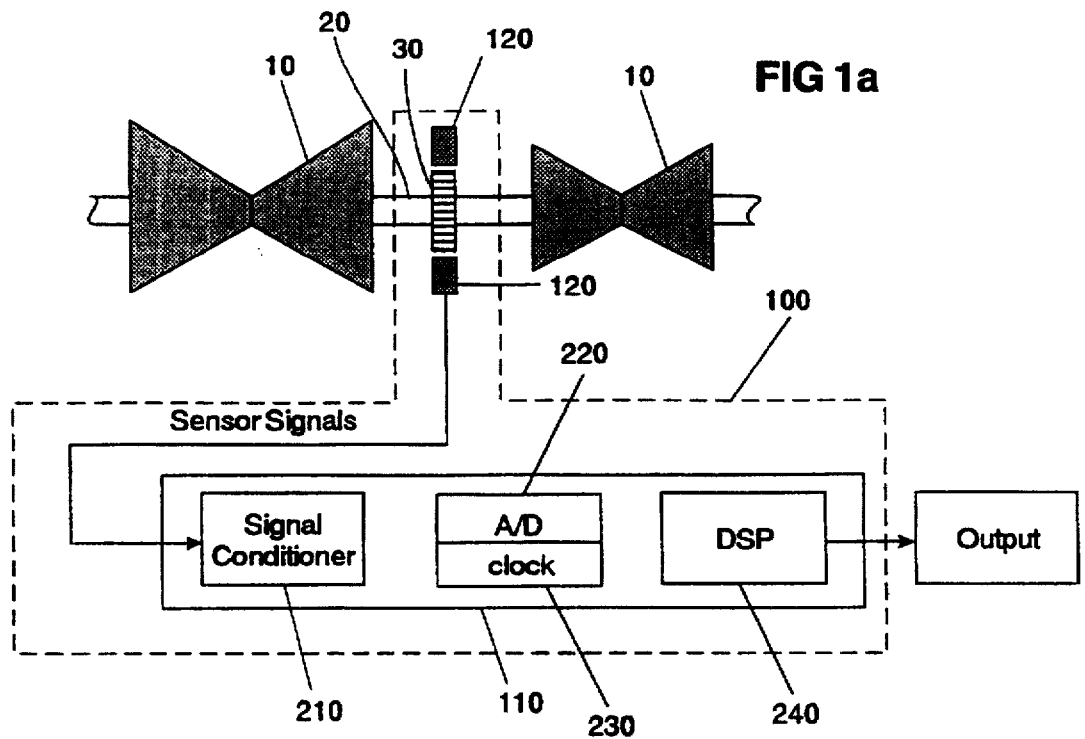
FIG. 1a is a schematic of placement of the invention on a turbine rotor.

FIG. 1a illustrates the present invention 100 monitoring a power turbine 10. The invention 100 consists of an electronics module 110 and sensor 120 detecting motion of the shaft 30 by monitoring motion of an encoder 20. The electronics module 110 provides means for conditioning, digitizing, clocking and processing the signals, and of storing and communicating results. The sensor 120 contains sensing elements 122 that detect rotation and translation of the encoder 30. Accelerometer sensing elements 124 detect translational motion of the sensor 120 due to vibration transmitted through the sensor mount 126.

Figure 1B:
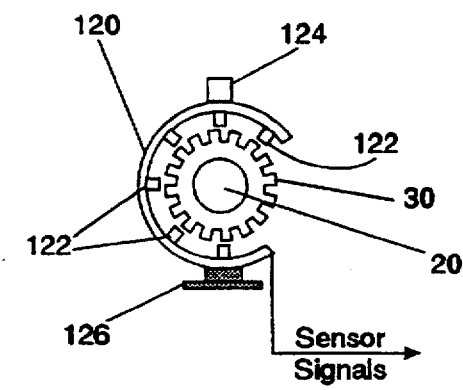
FIG. 1b illustrates the sensor.
Figure 1C:
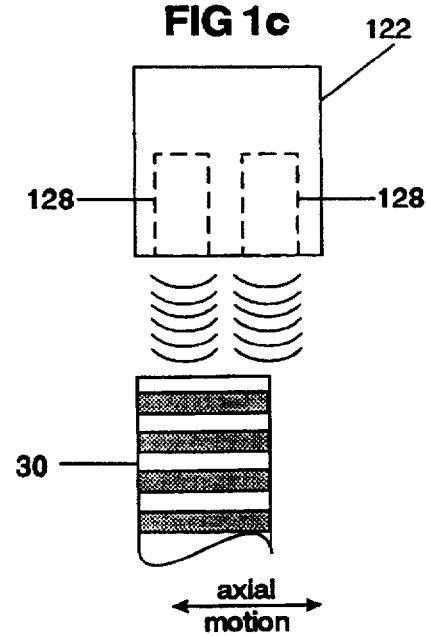
FIG. 1c illustrates the two components comprising a compound sensing element.

FIG 1b is a plan view of a sensor 120. The encoder 30 used most commonly in the invention is a gear affixed to the shaft 20 and provides sufficient tooth passing rate for sampling requirements. Other devices generating a pulsed or oscillating signal representing rotation may also be used. The sensing elements 122 of the encoder sensor 120 typically are in a curvilinear array aligned with the plane of rotation of the encoder 30. Preferably pairs of encoder sensing elements 122 are mounted so their axes are collinear and 180 degrees opposed. FIG 1c illustrates a sensing 122 element containing two sensing components 128 arrayed parallel to the axis of rotation with the sensing field of one component 128 transected by the edge of the encoder 30 and the second component 128 sensing only the lateral aspect of the encoder 30.

The electronics module 110 amplifies and anti-alias filters the various sensor signals by signal conditioning means 210, such as a commercially available analog conditioning board. Conditioned signals are transferred to a commercially available analog-to-digital converter (A/D) 220. The A/D 220 samples the conditioned signal at a rate determined by the computer clock 230 and produces a digital signal for each sensor signal. The digital signals, consisting of digital samples, are transferred to a commercially available digital signal processor (DSP) device 240. The DSP 240 temporarily stores portions of the digital signals, generates a speed clock, resamples the digital signals, and processes and analyzes the resampled digital signals. Unless otherwise stated, digital signals are the digital signals from encoder 30 sensing elements 122.

The speed clock is an array of discrete values of time ("resampling times"), forming a digital signal with a frequency composition based on the carrier frequency of the encoder (the "encoder carrier") and its low frequency modulations. Because machines do not turn perfectly smoothly, the encoder carrier component is quasi-periodic, meaning it has at least one frequency component that appears constant from cycle to cycle but can vary significantly over longer time periods.

By including low frequency modulations of the encoder carrier, the speed clock provides a highly accurate means of order tracking during signal processing. Order tracking is a processing technique designed to track variable speed equipment. Higher frequencies, such as those for resonances of diagnostic interest, are excluded from the speed clock. If they were not, they would be undesirably eliminated from the signal by the subsequent step of resampling. Retaining these higher frequencies in the speed clocked data is desirable as they are used for detecting mechanical change in the rotor.

The speed clock is also constructed to provide an integer number of resampling times during each rotation of the encoder. As a result the resampled signals ("speed clocked data") exhibits no leakage around the harmonics of turning speed of the rotor. When the number of samples per encoder rotation is further restricted to an integral power of 2, fast Fourier transformations can be used without introducing leakage artifacts. Following resampling, the speed clocked data can be properly processed with a wide range of signal processing techniques developed for periodic signals.

Figure 2:
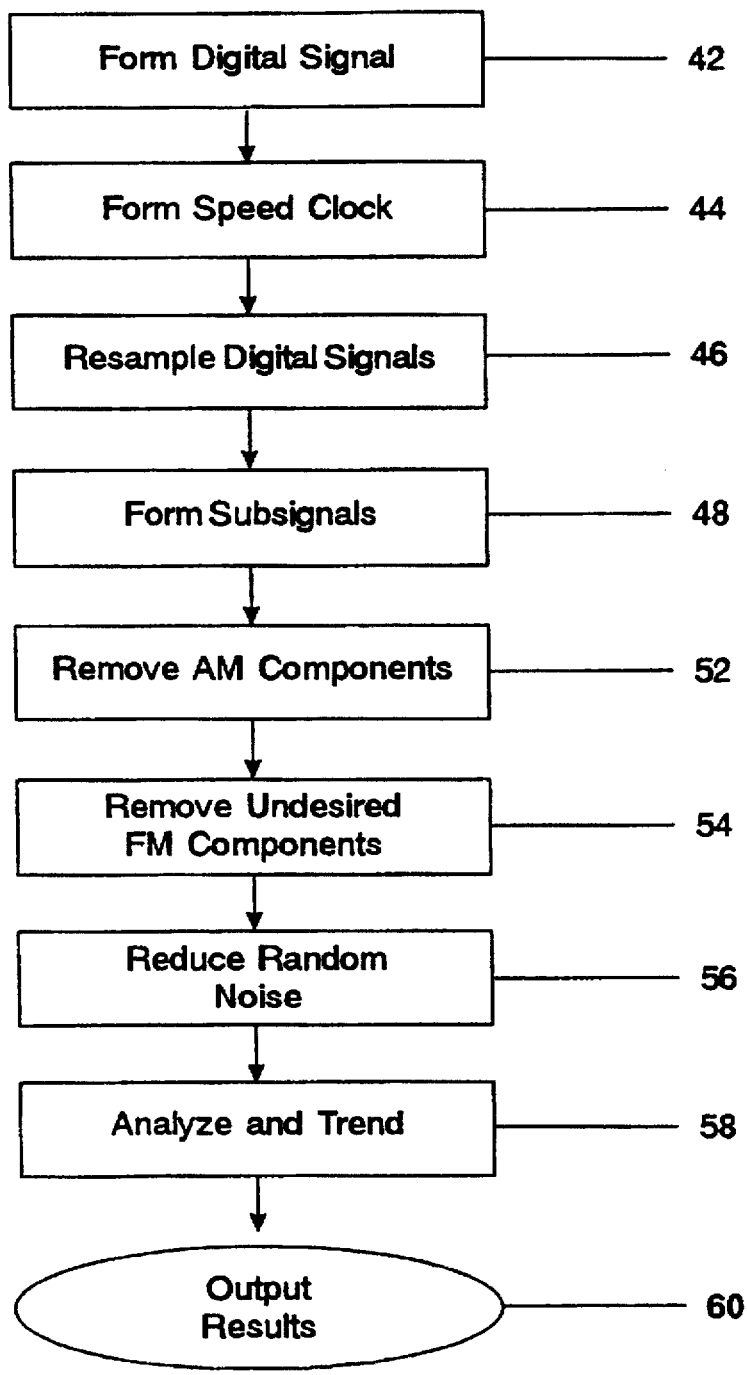
FIG. 2 illustrates the steps of signal processing.

FIG. 2 outlines the steps for processing digital signals. The first step 42 is to form the digital signals. The next step is to form a speed clock 44 from one digital signal according the method of the present invention, which is an enhancement of U.S. patent application Ser. No. 08/290,375 assigned to the assignee of the present invention. The digital signals associated with the various sensing elements 122 are resampled 46 under control of the speed clock to produce resampled or "speed clocked" data, the spectrum of which is free of leakage artifacts or RPM smear of the turning speed harmonics. Subsignals 48 are then formed from the speed clocked data.

AM signal components are removed 52 by one of various methods. The preferred method is by combining subsignals 48. This step removes signal components that can mask or be mistaken for FM signal components of interest. In the following step 54, FM signal components of interest are further isolated by removing FM components not of diagnostic interest. This step can be used to produce spectra with components representing just rotational vibration or just translational vibration, as desired.

A series of spectra are averaged to eliminate random noise 56 and further isolate the FM signal components of diagnostic interest. Tracking frequency shifts and amplitude changes of the vibrational resonances in such spectra detects 58 and quantifies rotor defects that are not detectable with existing on-line monitoring technology. The results are then output to alert those responsible for operation of the turbine.

Figure 3:
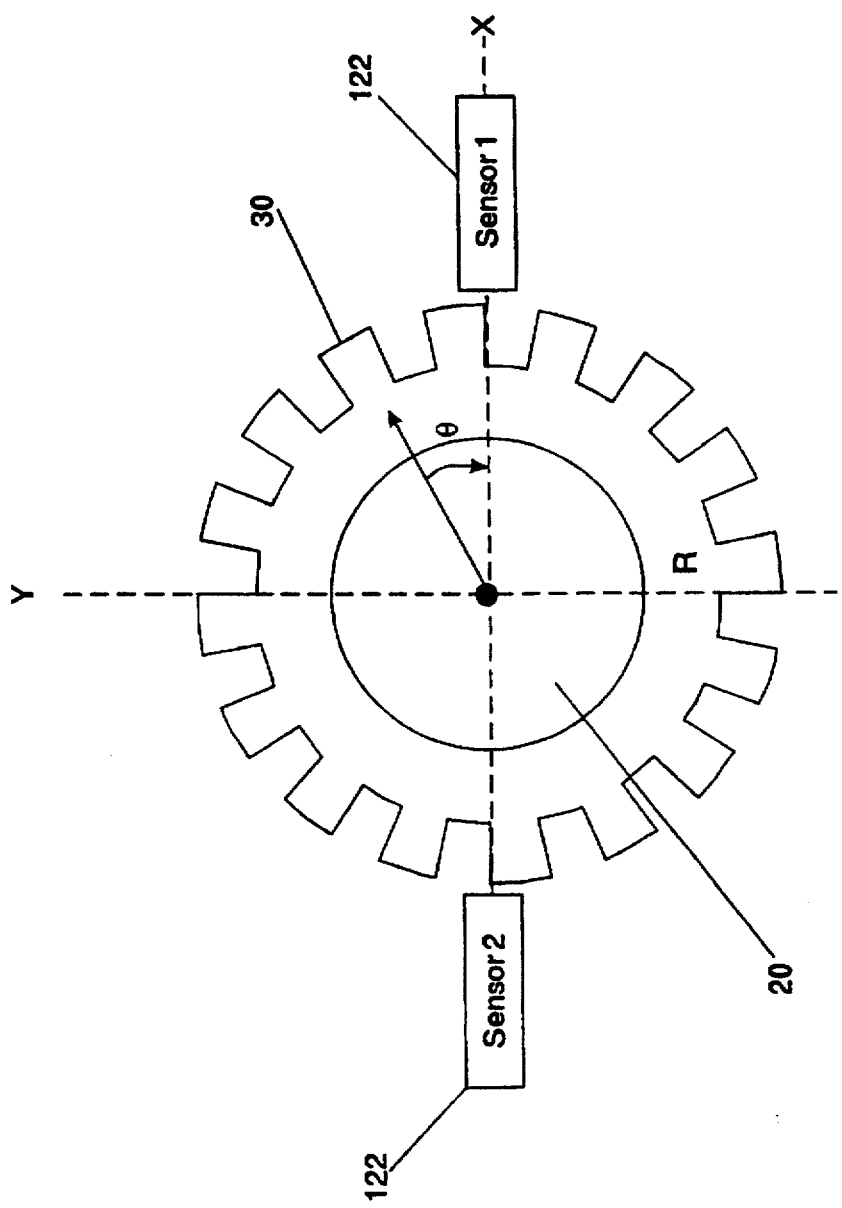
FIG. 3 illustrates shaft motion detected with two opposed sensing elements.

The difference in magnitude, sign and phase of the various classes of signal components between sensing elements 122 are used to isolate components of interest. For example, when two sensing elements are placed at opposing locations ("opposed sensing elements" 122) as shown in FIG. 3, both their AM and their FM components due to translational vibration have opposite signs as is shown in the equations below. The FM components due to rotational vibration are of the same sign in the two signals. Shaft motion in some arbitrary direction $\theta$ can be resolved into X and Y components according to:

$$X(t)=A\cos\theta\sin\omega t$$

$$Y(t)=A\sin\theta\sin\omega t$$

where A is amplitude, $\omega$ is frequency in radians per second, and t is time. As a result, the first sensing element 122 will produce FM artifacts representing apparent rotation due to translation in the in the Y direction, described by:

$$\beta_1(t)=A\sin\theta\sin\omega t/R$$

where R is encoder radius. Similarly, the second sensing element 122 will produce apparent rotation components described by:

$$\beta_2(t)=-A\sin\theta\sin\omega t/R$$

The $\beta_1$ and $\beta_2$ signal components cancel when the signals are added together, producing a signal free of FM signal components due to translation vibration. If practiced with AM-free signals, this step also removes all AM signal components. AM components also reflect sensor and encoder differences. These differences may be readily compensated so that addition of the two signals fully cancels the AM components. Sensor differences include sensitivity while encoder differences include variations in gear teeth. Thus, with AM components also removed, the spectrum contains only rotational vibration FM random noise, which noise is subsequently removed.

Figure 4A:
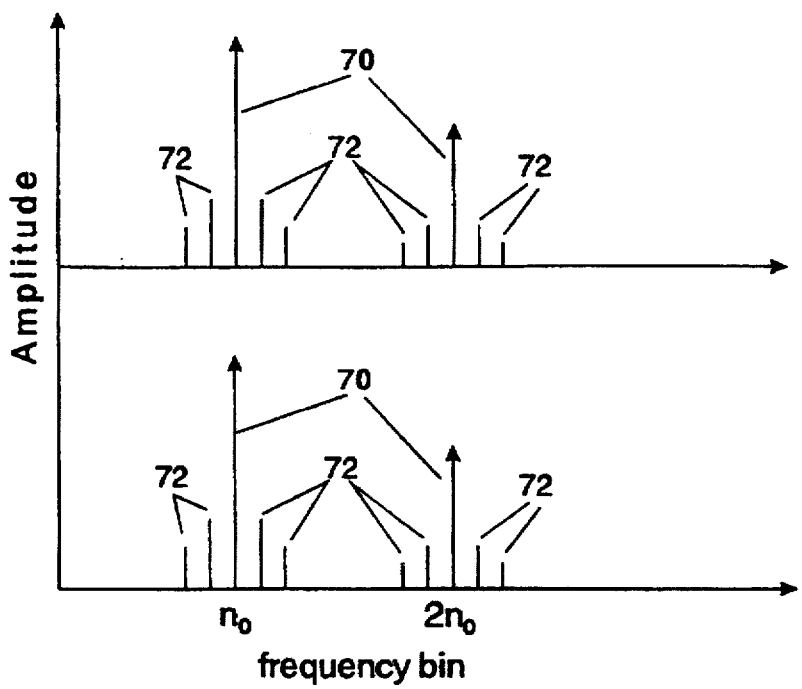
FIG. 4a illustrates idealized amplitude spectra for signals from two opposed sensing elements.

FIG. 4a illustrates idealized amplitude spectra for resampled signals from opposed sensing elements 122. The digital signals each have a subsignal centered around each harmonic, as previously defined. Sideband groups of a subsignal are comprised of AM and FM modulations and random noise. Frequency content of the AM and FM components of the sideband groups are identical among the subsignals. Amplitude and phase differ by fixed amounts, which are readily normalized and compensated. Following compensation, the signals are combined to remove undesirable AM signal components.

In the step of AM component removing 52, the normalized signals are subjected to a step of subsignal forming 48. A subsignal is composed of a harmonic 70 and the groups of sidebands 72 associated with it. A normalized signal is frequency and phase shifted so the harmonic 70 at the center of its first subsignal is positioned at 0 Hz, with zero phase and unit magnitude. The process is repeated, shifting the central harmonic of the second subsignal to 0 Hz. Each of the two shifted subsignals is then low pass filtered with a cut off frequency approximately one-half the frequency separation between the two harmonics of the carrier signal prior to shifting. The shifted subsignals can also be decimated, using standard techniques, because when centered at 0 Hz, they are oversampled relative to the Nyquist frequency.

The process is repeated for the second of the opposed signals. The final result is four equivalent subsignals consisting of a low pass filtered sideband group centered around a carrier with zero phase and unit magnitude at 0 Hz. Only random noise differs among the subsignals and it is subsequently removed.

Figure 4B:
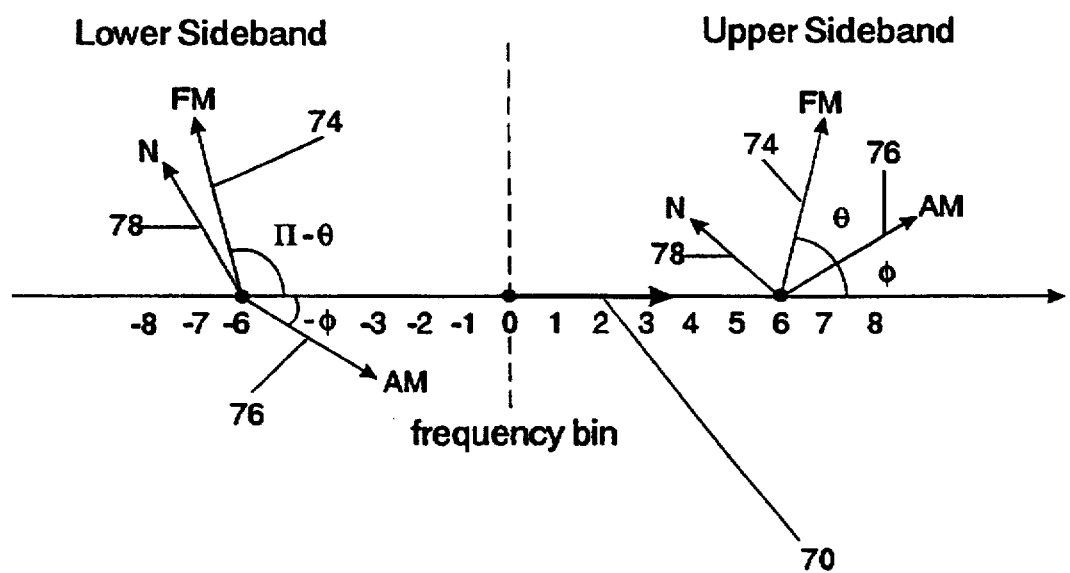
FIG. 4b illustrates a complex spectrum for one subsignal.

FIG. 4b illustrates an idealized complex spectrum representation of one subsignal. The harmonic 70 has zero frequency and phase and unit amplitude. The FM component 74 of the upper sideband has a phase angle $\theta$ while the FM component 74 of the lower sideband has a phase angle of $\Pi-\theta$. If while the AM component 76 has a phase angle of $\phi$ in the upper sideband, its phase angle is $-\phi$ in the lower sideband. Typically the phase difference between FM and AM components $\theta-\phi$ is fixed and not random. The noise component, N, 78 has random phase between the upper and lower sidebands.

AM components are removed 52 by forming combined sidebands of the subsignals. A combined lower sideband is formed from the first subsignal by subtracting the complex conjugate of the upper sideband from the lower sideband and dividing the result by 2. A combined upper sideband is formed from the second subsignal by subtracting the complex conjugate of its lower sideband from its upper sideband and dividing the result by 2. The process is then repeated with the second digital signal.

FM components due to translational vibration are then removed 54 by adding together the two AM-free spectra for the opposed signals. The remaining FM components are those due exclusively to rotational vibration. Alternatively, the two AM-free spectra may be subtracted to remove FM components due to rotational vibration and produce a spectrum of FM components due only to relative motion.

Following addition, the upper and lower sidebands of a summed spectrum are multiplied together to produce a complex spectrum whose real part consists of the FM components plus random noise. Random noise is then reduced 56 by averaging a number of such spectra. Individual frequency components of the averaged spectrum are then analyzed and trended 58 to detect changes indicating mechanical deterioration of the rotor components.

Figure 5A:
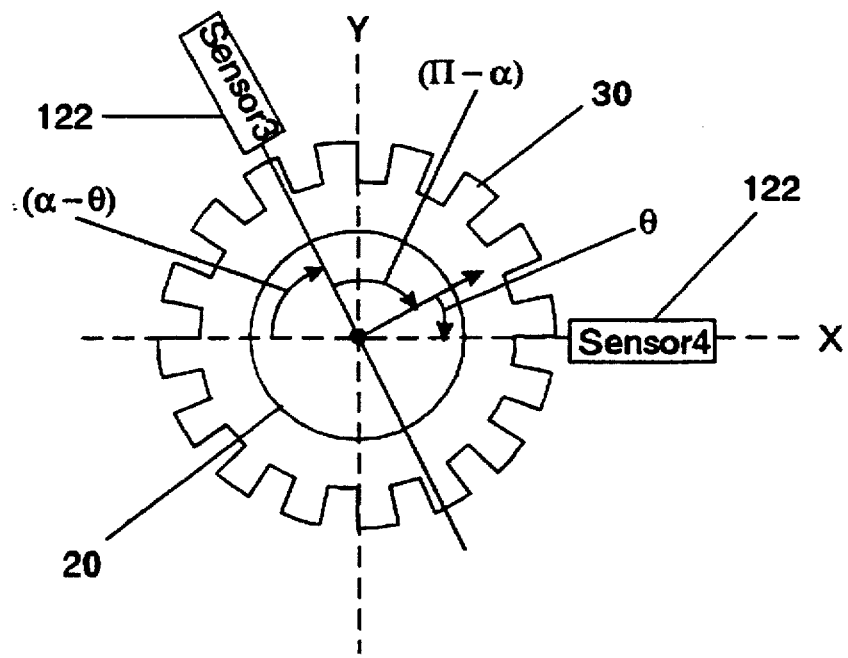
FIG. 5a illustrates two arbitrarily oriented sensing elements.

FIG. 5a illustrates the general case of two sensors separated by an arbitrary angle α1 the signals from which are processed to isolate FM components due to rotational vibration. The signals here are not AM-free. The sensing axis of the Sensor1, first sensing element 122, defines the X axis. The orientation of the second sensing element 122 relative to first is defined by the angle α. Relative motion defined in terms of amplitude (A), frequency (ω) and direction (θ) and has components normal (N) to each sensing element 122 described by:

$$N1 = A\sin\omega t \sin\theta$$

$$N2 = A\sin\omega t \cos(\alpha - \theta - \Pi/2)$$

Because relative motion normal to the axis of a sensing element changes the arrival time of the detectable elements of the encoder 30, N1 and N2 represent FM signal components due to the relative motion, which are separated from rotational vibration FM components.

Signals not previously subjected to AM-removal retain signal components due to relative motion parallel (P) to the axis of each sensing element 122 described by:

$$P1 = -A\sin\omega t \cos\theta$$

$$P2 = -A\sin\omega t \sin(\alpha - \theta - P/2)$$

For signals previously subjected to AM-removal, P1=P2=0.

Figure 5B:
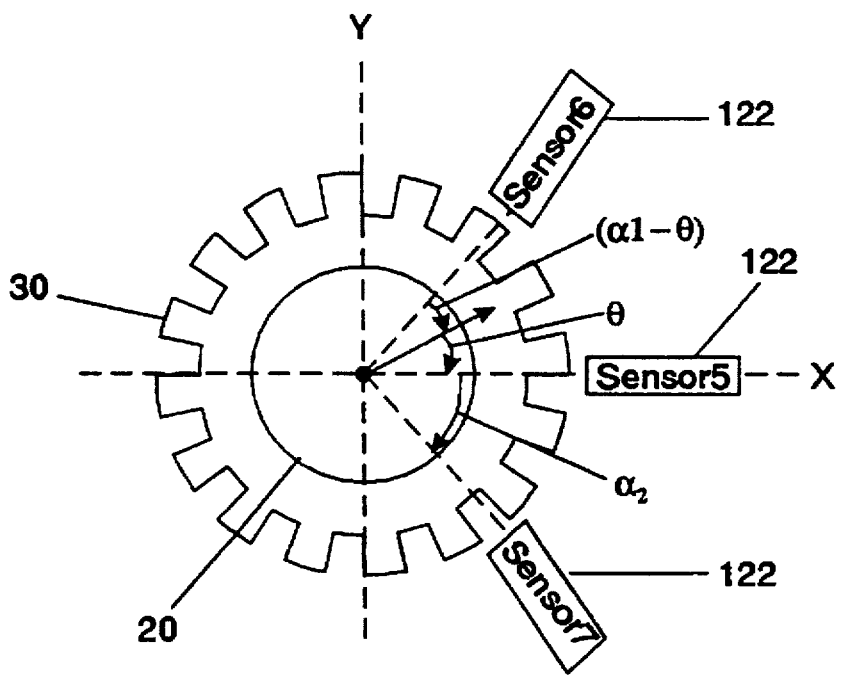
FIG. 5b illustrates three arbitrarily oriented sensing elements.

FIG. 5b illustrates three co-planar sensing elements 122, illustrated as Sensor3, Sensor4 and Sensor5, used to determine the relative motion of the shaft in the θ direction. Sensing elements 122 have arbitrary orientations, defined by angles α1 and α2. Using AM removed spectra, the FM components due to relative motion in the normal direction are described by:

$$N3 = A\sin\omega t \sin\theta$$

$$N4 = -A\sin\omega t \cos(\alpha 1 - \theta - \pi/2)$$

$$N5 = A\sin\omega t \cos(\alpha 2 - \theta - \pi/2)$$

where N3 denotes the normal component of the signal from the 3$^{rd}$ sensing element 122, and N4 and N5 similarly denoting the first and second. In the case of three equally spaced sensing elements, α1=−α2=Π/3, combining the normal components of the AM removed spectra yields:

$$N3+N4+N5 = A\cos\omega t \sin\theta(1-\sin\alpha 1-\sin\alpha 2) = 0$$

the cancellation demonstrating the combined FM spectra for the three equally spaced sensing elements 122. The relative motion effects cancel and therefore the remaining FM components define pure rotational vibration. Similarly, it can also be shown that three sensors in the plane of rotation can be used to define pure translational vibration.

Figure 6A:
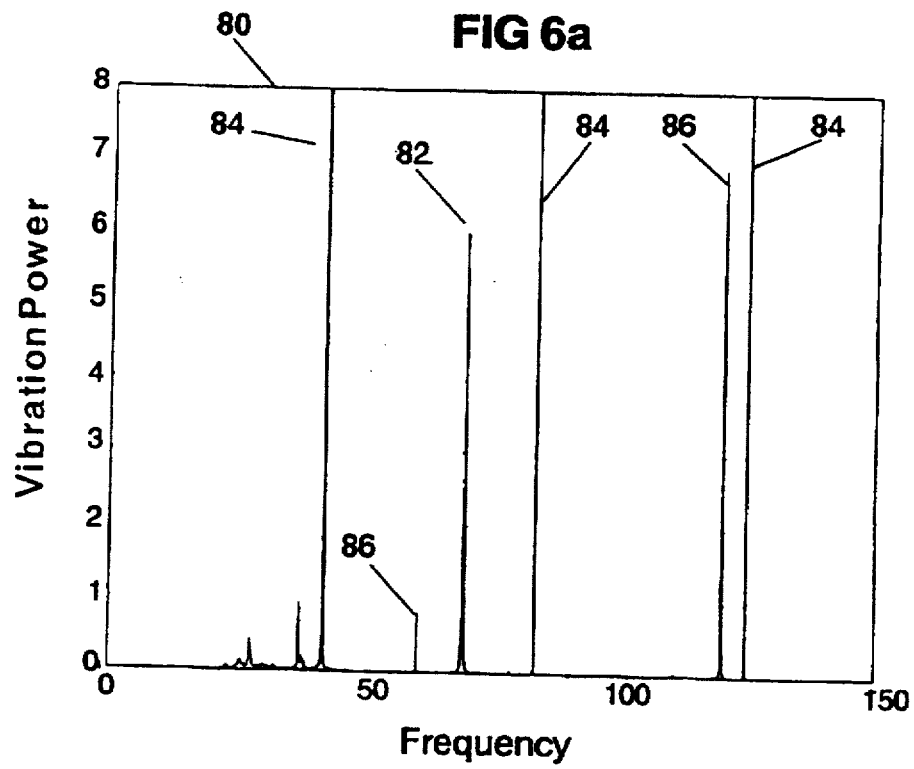
FIG. 6a illustrates a torsional resonance spectrum for a turbomachine shaft.

FIG. 6a is a spectrum 82 including the first torsional resonance 84 of a shaft subjected to experimental cracking. The spectrum 84 also includes harmonics of turning speed 84 and components due to electrical line effects 86. As a shaft cracks, its torsional stiffness decreases as does its torsional resonance 84. The frequency resolution of the torsional resonance 84 is higher here than obtained with any other on-line monitoring technology. This improved resolution permits more accurate measurement frequency shift. Such accuracy enables earlier detection and more accurate quantifying of rotor faults.

Figure 6B:
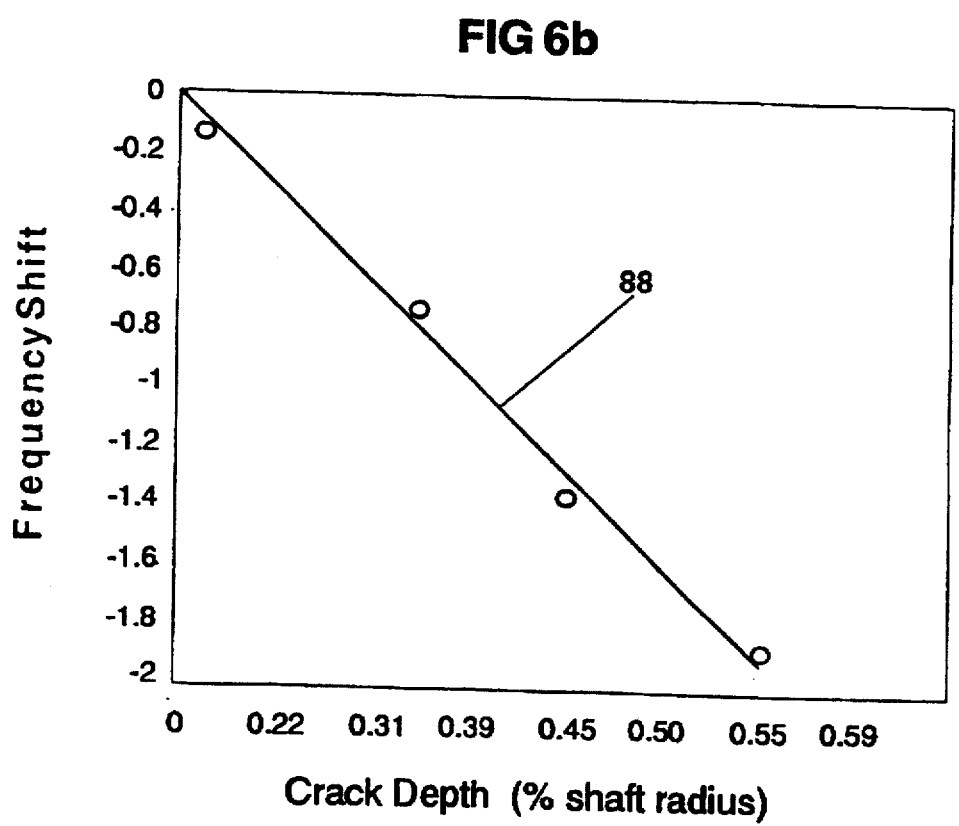

FIG. 6b illustrates graphically the correlation 88 of resonance frequency shift to crack size. The data demonstrates a very high correlation 88 between crack size and frequency shift. As a result, monitoring frequency shift of the torsional resonance 82 is a sensitive and precise means of determining crack size in rotor shafts in operating turbomachines.

Rotor components including turbine blades vibrate at frequencies determined by size, shape and material properties. When a blade loses mass, e.g. due to erosion at the blade tip in combustion turbines, the inertia of the blades is reduced. As a result, they spring back more rapidly when deflected by the gases flowing over them. The resulting more rapid vibration is seen as an increase in the resonance frequency of the blades. Because blade tip erosion degrades efficiency in turbomachines, such monitoring is uniquely valuable for controlling operating costs in all classes of turbomachine.

Flutter, stall and cavitation degrade the performance of turbomachines, as well as causing mechanical deterioration. When turbine blades flutter, they vibrate synchronously. This condition increases the stresses in the blades and causes cracks leading to catastrophic failure. By detecting the increase in amplitude resulting from flutter, the invention can readily detect the condition of the turbomachine.

Other conditions are detectable with the present invention. Stall, which disrupts lift of the blades, alters their resonance power and can be detected by monitoring the amplitude of the appropriate resonances. Cavitation involving separation of a fluid from the vanes in a pump rotor generates voids or bubbles in the fluid, which acts as a broad band excitation of the rotor components. Rising amplitude and frequency of the spectral components are used to detect cavitation.

Development of rotor imbalance, which typically is inferred from shaft displacement at the bearings, indicates mechanical changes in turbomachines. The displacements, which are monitored at harmonics of turning speed, typically are sensed with proximity probes having a detection threshold of 0.001 inch, which is acceptable for low speed machines. In higher speed machines the stabilizing effects of angular momentum oppose the imbalance force and prevent the displacements that indicate mechanical problems. The result is that displacement monitoring will not indicate rotor problems in any practical or useful manner for high speed turbomachines.

The present invention, which uses sideband signal processing, is significantly more sensitive that proximity sensing to rotor displacements. It also has a very broad band width, enabling detection and monitoring of translational vibration at much higher frequencies than the upper limit for proximity probes.

All manner of computer analysis that depends on vibrational resonance data may be integrated into the present invention, enabling their implementation as continuous on-line technology. For example, finite element modelling commonly used to model blade cracks and other damage may be implemented to continuously model cracks. The present invention can be used to detect changes in efficiency due to changes in mass of the rotor components.

An alternative embodiment of the sensor 120 includes accelerometer elements 124 for removing artifacts due to apparent translational motion due to vibration transmitted through the sensor mount 126. The encoder sensing elements and the accelerometer sensing elements will have equivalent signal components due to vibration of the sensor. In some applications, sensor vibration artifacts can be large and mask encoder signal components of diagnostic interest. In such cases, vibration effects are removed from the encoder signals by Wiener filtering. The result of removing vibration effects is a signal accurately reflecting motion of the shaft 20 even when significant background vibration is present.

Translational vibration in the axial direction of the rotor uses an alternative embodiment of the sensing element 122. Because the amplitude of a signal is proportional to the fraction of a sensing element field detecting an encoder 30, AM effects can be used to determine axial translocation. A sensing element 124 with two components 128, one centered over the face and one over the edge of the encoder 30 enables detection of the AM effects of axial motion. Because the FM components are identical, subtracting the signals from the two components 128 removes the FM components and yields the difference between the AM components of the sensing component 128 with the bifurcated field and the sensing element component 128 centered over the encoder 30.

As an alternative to the pulsed signals from sensing a multi-element encoder 30, signals from multiple sensing element 122 detecting a single element encoder, such as a key way, may also be used. The sensing elements 122 are arrayed evenly in an arc tracking the rotation. Preferably the sensing elements 122 are evenly spaced entirely around the shaft 30 in the plane of its rotation. Signals from the multiple sensing elements 122 are combined to produce a single signal equivalent to that from a single sensing element 122 detecting a multiple-element encoder 30.

In summary, the present invention fully isolates the rotational resonances from the signal from an encoder 30 providing dramatic improvements in analytical sensitivity and resolution which are critical to reliable early warning of impending failures in turbomachines. It removes AM signal components properly and avoids introducing signal artifacts that can mask or be confused with signal component representing rotor resonances. It also completely removes FM components due to translational vibration and prevents frequency smearing due to small variations in rotor turning speed. These benefits individually and together provide economic solutions for protecting turbomachines against catastrophic failure that are beyond the reach of current technology known to the applicants.

While the invention has been described with reference to the preferred embodiment, this description is not intended to be limiting. It will be appreciated by those of ordinary skill in the art that modifications may be made without departing from the spirit and scope of the invention.

We claim:

1. A method for analyzing the condition and performance of turbomachines by processing signals representing rotor motion comprising the steps of:

a) acquiring signals from a plurality of sensing elements which detect motion of a rotor wherein at least one of said sensing elements detects rotational motion;

b) isolating signal components representing the rotational vibration and translational vibration components of said rotor motion;

c) analyzing said signal components over time to determine the condition and performance of said turbomachine.

2. The method of claim 1 wherein said at least one of said signals is an encoder signal, said encoder signals having a plurality of pulses per rotation of said rotor; and said pulses have sideband groups comprised of carrier frequency and modulation frequency components.

3. The method of claim 2 wherein at least one of said sensing elements has a sensing axis perpendicular to the axis of rotation of said rotor.

4. The method of claim 3 wherein at least one of said sensing elements detects motion of a single encoder; and said processing removes amplitude modulation components from said signals to produce amplitude modulation removed signals.

5. The method of claim 4 wherein said processing further includes forming combined sidebands free of amplitude modulation components for a plurality of subsignals of said signals.

6. The method of claim 5 wherein said amplitude modulation removed signals are combined to separate signal components due to rotational vibration from those due to translational vibration.

7. The method of claim 6 wherein said signals derive from two of said sensing elements having sensing fields oriented at 180 degrees relative to each other and said sensing elements lie in the plane of rotation.

8. The method of claim 7 further comprising the steps of:

d) normalizing said signals for phase and amplitude; and e) adding said normalized signals in the frequency domain.

9. The method of claim 3 wherein said processing includes Wiener filtering to remove signal components due to extraneous vibration.

10. The method of claim 2 wherein said rotational vibration is analyzed for frequency shifts indicating cracking and erosion of rotor components.

11. The method of claim 2 wherein said motion is analyzed to determine balance, efficiency, flutter and stall of said rotor.

12. The method of claim 3 wherein two of said perpendicular sensing elements are closely adjacent and lie in a plane containing said axis of rotation such that one said element is centered over said encoder and the other sensing element lies over an edge of said encoder.

13. The method of claim 12 wherein said encoder signals are combined to determine vibration in the direction of said axis of rotation.

14. The method of claim 1 further comprising the step of communicating the results of said analyzing to an operator.

15. A device for detecting rotor vibrations and resonances in operating turbomachines comprising:

sensor means for sensing motion of a rotor at various points around the circumference of said rotor, yielding a plurality of signals;

conditioning means for conditioning and digitizing said signals to produce digital signals;

processing means for processing said digital signals to produce resampled signals, and other output;

analyzing means for determining the effects of sensor motion on said resampled signals and other output; and interface means for communicating results of said processing and determining to an operator.

16. The device according to claim 15 wherein said sensor means comprise a sensor having a plurality of sensing elements, each sensing element having a known location and orientation relative to the other sensing elements wherein at least one of said sensor means senses encoder motion.

17. The device according to claim 16 wherein said sensing elements include at least one pair of sensor elements directable at the axis of rotation of said rotor with each sensing element having diametrically opposed sensing fields.

18. The device according to claim 17 wherein said sensor means include vibration detection means for detecting vibrations of said sensor means.

19. The device according to claim 18 wherein at least one of said sensing elements has first and second adjacent components, each component having sensing fields that lie in a plane which includes but are perpendicular to said axis of rotation; and wherein the first said adjacent component detects a first translation along the axis of said sensing element and the second said component detects said first translation together with a second translation in the direction of said axis of rotation of the rotor.

* * * * *